(12) United States Patent
Smith et al.

(10) Patent No.: US 9,245,106 B2
(45) Date of Patent: *Jan. 26, 2016

(54) PROVIDING A MULTI-PHASE LOCKSTEP INTEGRITY REPORTING MECHANISM

(71) Applicant: Intel Corporation, Santa Clara, CA (US)

(72) Inventors: Ned M. Smith, Beaverton, OR (US); Vedvyas Shanbhogue, Austin, TX (US); Geoffrey S. Strongin, Beaverton, OR (US); Willard M. Wiseman, Tigard, OR (US); David W. Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/464,874

(22) Filed: Aug. 21, 2014

(65) Prior Publication Data

US 2014/0359754 A1 Dec. 4, 2014

Related U.S. Application Data

(63) Continuation of application No. 13/925,991, filed on Jun. 25, 2013, now Pat. No. 8,844,021, which is a continuation of application No. 12/845,528, filed on Jul. 28, 2010, now Pat. No. 8,516,551.

(51) Int. Cl.
| | |
|---|---|
| *G06F 12/00* | (2006.01) |
| *G06F 21/44* | (2013.01) |
| *H04L 29/08* | (2006.01) |
| *G06F 21/57* | (2013.01) |
| *H04L 29/06* | (2006.01) |

(52) U.S. Cl.
CPC ............... *G06F 21/44* (2013.01); *G06F 21/57* (2013.01); *H04L 67/125* (2013.01); *H04L 63/126* (2013.01)

(58) Field of Classification Search
USPC .......................................................... 726/17
See application file for complete search history.

(56) References Cited

U.S. PATENT DOCUMENTS

| | | | |
|---|---|---|---|
| 7,587,593 B2 * | 9/2009 | Murakoshi ................... | 713/165 |
| 7,590,870 B2 | 9/2009 | Catherman et al. | |
| 7,653,819 B2 | 1/2010 | Bade et al. | |

(Continued)

FOREIGN PATENT DOCUMENTS

EP 2194476 A1 6/2010

OTHER PUBLICATIONS

Patent Cooperation Treaty, "Notification of Transmittal of International Search Report and Written Opinion of the International Searching Authority," in international application No. PCT/US2011/045798, mailed Feb. 9, 2012.

(Continued)

*Primary Examiner* — Amare F Tabor
(74) *Attorney, Agent, or Firm* — Trop, Pruner & Hu, P.C.

(57) ABSTRACT

In one embodiment, a processor can enforce a blacklist and validate, according to a multi-phase lockstep integrity protocol, a device coupled to the processor. Such enforcement may prevent the device from accessing one or more resources of a system prior to the validation. The blacklist may include a list of devices that have not been validated according to the multi-phase lockstep integrity protocol. Other embodiments are described and claimed.

18 Claims, 13 Drawing Sheets

(56) References Cited

U.S. PATENT DOCUMENTS

| | | | |
|---|---|---|---|
| 7,716,494 B2 | 5/2010 | Liu et al. | |
| 8,037,318 B2 | 10/2011 | Tahan | |
| 8,127,146 B2 * | 2/2012 | Thom et al. | 713/189 |
| 8,307,205 B2 * | 11/2012 | Cha et al. | 713/166 |
| 2008/0126779 A1 | 5/2008 | Smith | |
| 2008/0244292 A1 | 10/2008 | Kumar et al. | |
| 2009/0132837 A1 | 5/2009 | Kumar | |
| 2010/0082987 A1 * | 4/2010 | Thom et al. | 713/171 |
| 2010/0161998 A1 | 6/2010 | Chen et al. | |
| 2010/0220854 A1 * | 9/2010 | Melton | 380/37 |
| 2011/0010543 A1 * | 1/2011 | Schmidt et al. | 713/168 |
| 2011/0238541 A1 | 9/2011 | Challener et al. | |

OTHER PUBLICATIONS

U.S. Appl. No. 12/639,616, filed Dec. 16, 2009, entitled: "Providing Integrity Verification and Attestation in a Hidden Execution Environment".

Intel ® Trusted Execution Technology Architectural Overview, 8 pages, © 2003.

Korean Patent Office, Office Action Mailed May 27, 2014, in Korean Application No. 2013-7004939.

* cited by examiner

| Row | Type (8-bits) | Len (16-bits) | Value (x-bits) |
|---|---|---|---|
| 0 | Policy (HPKs) | 16 + 33 = 49 | <guid><alg><hash> |
| 1 | Detail (K0) | 49 | <guid><alg><hash> |
| 2 | Policy (APKs) | 49 | <guid><alg><hash> |
| 3 | Detail (K1) | 49 | <guid><alg><hash> |
| 4 | Detail (A0) | 49 | <guid><alg><hash> |
| 5 | Detail (A1) | 49 | <guid><alg><hash> |
| 6 | Detail (A2) | 49 | <guid><alg><hash> |
| 7 | Detail (A3) | 49 | <guid><alg><hash> |

FIG. 4

PROVIDING A MULTI-PHASE LOCKSTEP INTEGRITY REPORTING MECHANISM

This application is a continuation of U.S. patent application Ser. No. 13/925,991, filed Jun. 25, 2013, which is a continuation of U.S. patent application Ser. No. 12/845,528, filed Jul. 28, 2010, now U.S. Pat. No. 8,516,551, issued Aug. 20, 2013, the content of which is hereby incorporated by reference.

BACKGROUND

Many computer systems contain a root complex communications bus according to a Peripheral Component Interconnect Express™ (PCI Express™ (PCIe™)) protocol in accordance with the PCI Express™ Specification Base Specification version 2.0 (published Jan. 17, 2007) (hereafter the PCIe™ Specification). In such systems, platform devices, embedded microprocessors, input/output (IO) controllers, IO bridges and virtual devices running on a central processing unit (CPU) may all interact. Platform initialization and manageability protocols used on the root complex bus can support both master-slave as well as peer-peer interaction models. Root complex nodes may interact directly with other nodes via a direct memory access (DMA) architecture and through management control transport protocol (MCTP).

As the sophistication and capabilities of root complex devices increase, the security risks associated with possible compromise increase also. Devices accordingly are mutually suspicious of other devices until the configuration of such devices is verified. Current verification processes however are time consuming and complex, and can still lead to a security compromise.

BRIEF DESCRIPTION OF THE DRAWINGS

FIG. 4 is a block diagram of a table in accordance with one embodiment of the present invention.

DETAILED DESCRIPTION

In various embodiments, a method is provided for bootstrapping trust across multiple root complex devices for both master-slave and peer-to-peer interaction models, where initially each device is mutually distrusting of other devices. A two-phase lockstep protocol for reporting and verifying device integrity can ensure untrusted devices can be isolated from subsequent interactions because they can pose a significant risk to security. That is, a rogue device, if permitted to become fully operational, may exploit weaknesses in firmware/microcode for root complex devices and virtual devices to gain unauthorized access. For example, rogue devices can execute code that is hidden from the host firmware/software (which may have launch control policies for acceptable/unacceptable device firmware). Without protection as described herein, the device on the root complex may have access to host resources. Rogue code could be used to access host resources or stage attacks on devices that have direct access to such host resources. Root complex devices can introduce a virtual device message (VDM) that is trusted for use by some devices but not others. Thus rogue devices may masquerade as a trusted device for the purpose of interacting using VDMs.

Figure 1:
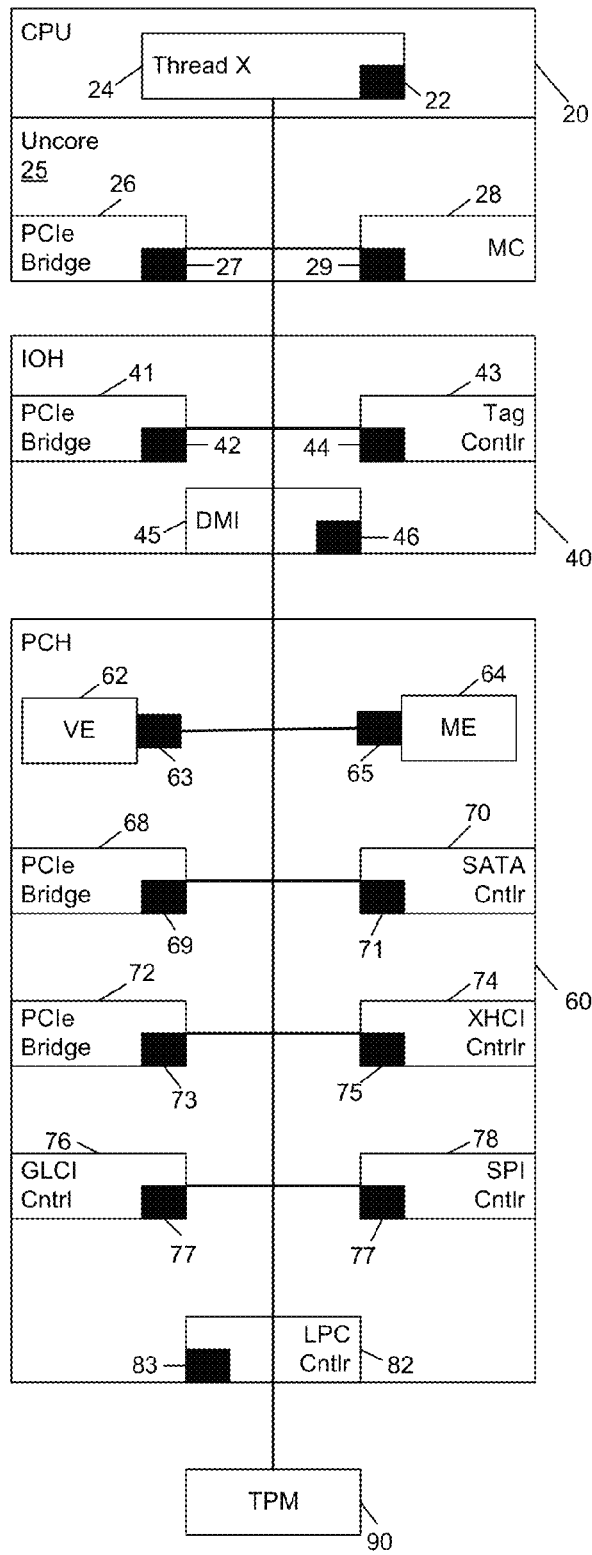
FIG. 1 is a block diagram of a system in accordance with an embodiment of the present invention.

Referring now to FIG. 1, shown is a block diagram of a system in accordance with an embodiment of the present invention. As shown in FIG. 1, system 10 may be a PCIe™-based system in which various components are coupled via a root complex bus 30. Specifically in the embodiment of FIG. 1, a processor 20 is coupled via bus 30 to an input output hub (IOH) 40, which in turn couples to a peripheral controller hub (PCH) 60. In turn, PCH 60 may be coupled to a trusted platform module (TPM) 90. As seen, each of the components may include various root complex devices that are coupled to the root complex bus. Each such device may include or may be associated with a PCI configuration space, which may be a portion of a local memory that can include configuration information. In various embodiments, such configuration spaces may further include an integrity reporting construct in accordance with an embodiment of the present invention.

As seen in FIG. 1, processor 20 may include a plurality of cores, only one of which is shown for ease of illustration in FIG. 1. As seen, core 22, which may execute a thread x, that may execute a hidden resource manager (HRM) details of which are described further below, may include a configuration space 24. In addition, processor 20 may further include an uncore 25 which may include various logic of the processor that executes outside of the processor cores. In addition, processor 20 may further include an integrated memory controller (IMC) 28 that may couple to a system memory (not shown for ease of illustration in FIG. 1). A bridge 26 may be present, which in one embodiment may be a PCIe™ bridge, that may couple to one or more PCIe™ devices coupled to the processor. As seen, each of these components may include associated configuration spaces 27 and 29.

As further seen in the embodiment of FIG. 1, IOH 40 may also include a PCIe™ bridge 41 and a controller 43 which in one embodiment may be a joint test action group (JTAG) controller to enable various testing operations to be performed. In addition, a bridge 45 which may be in accordance with a direct media interface (DMI) specification may also be present. As seen, each of these components may include configuration spaces, namely spaces 42, 44, and 46.

As further shown in FIG. 1, PCH 60 may include various components including bridges and controllers. In addition, a virtualization engine (VE) 62 and a manageability engine (ME) 64 may be present, each of which may be associated with corresponding configuration spaces 63 and 65. As seen, the components of PCH 60 may include controllers and bridges 68, 70, 72, 74, 76, 78, and 82, each of which includes a corresponding configuration space 69, 71, 73, 75, 77, 79, and 83. Such controllers may include extensible host controller interface (XHCI), advanced host controller interface (AHCI), low pin count (LPC) and serial peripheral interface (SPI) controllers, among others. In some embodiments, components may include further sensors and special purpose devices.

As seen, each node in the root complex may have a PCI configuration space which can be used to store integrity measurements of device capabilities. Complex devices have loadable firmware, can support patch and update and may be connected to other buses or networks. Hence, the risk of exploit by rogue software, host or device connected to the root complex device can be significant.

Figure 2:
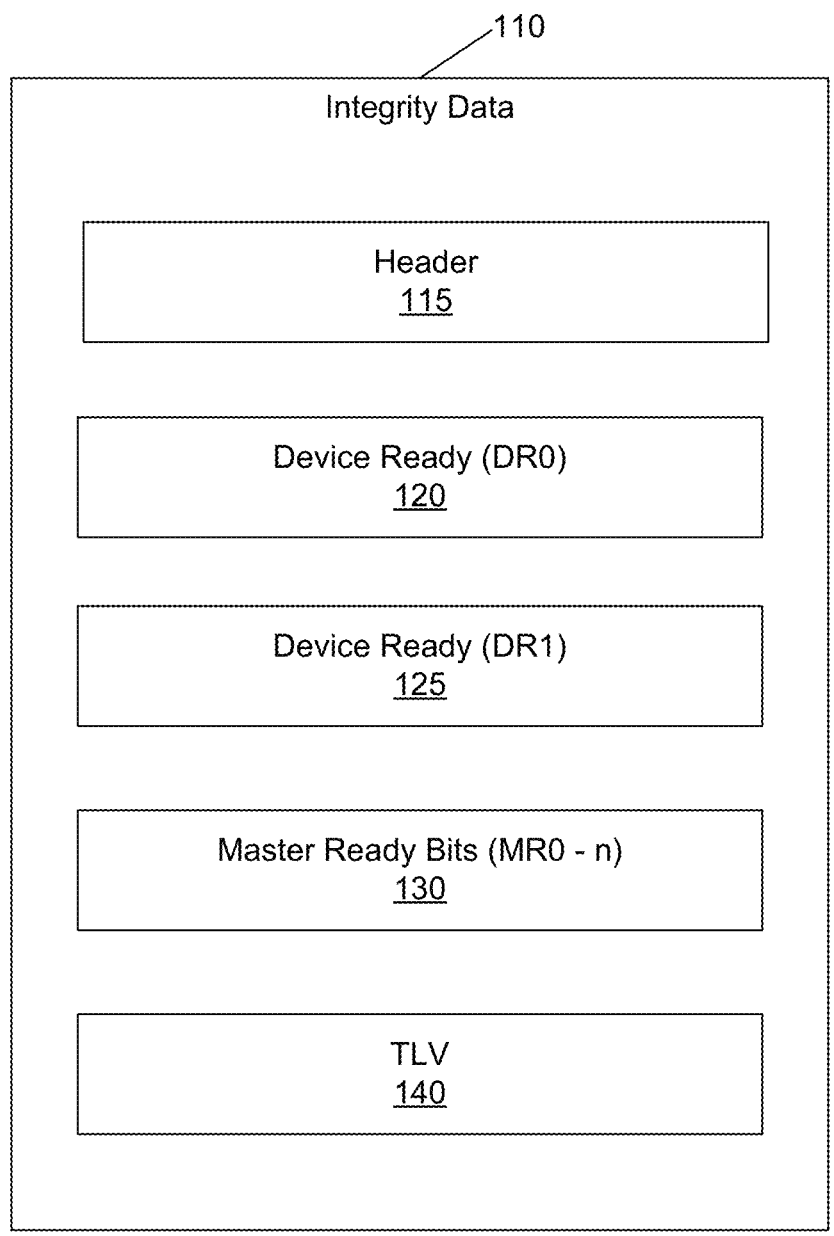
FIG. 2 is a block diagram of a configuration space with an integrity reporting construct in accordance with one embodiment of the present invention.

Referring now to FIG. 2, shown is a block diagram of a PCIe™ configuration space with an integrity reporting construct, namely an integrity data block 100 in accordance with one embodiment of the present invention. As seen, block 100, which may be stored in a configuration space of a given device, includes integrity data 110. Such data may include a header 115, which provides various identification information. In addition, various indicators both for a device and other devices that may act as a master for a given integrity lockstep protocol may be present. Specifically, a first device ready indicator (DR0) 120 and a second device ready indicator (DR1) 125 may be present. As will be discussed further below, such indicators may be set by the device to indicate that the device has reached a particular stage of its authentication protocol. Similarly, one or more master indicators (MR0-N) 130 may provide similar information for a master. As further seen, a table 140 may be present. This table may be implemented as a list of tag-length-value (TLV) entries. In the embodiment of FIG. 2, the table is contained in the PCIe™ configuration space, although it may also be stored in other device memory. This table may store various information regarding integrity measurements and metrics performed with regard to the device, as will be discussed further below. In this way, PCIe™ configuration space is used to record and report on the integrity of self-check status.

When a root complex node initializes it may load applications, patches, firmware or update packages. Package integrity can be described using a manifest containing one or more integrity hashes that is digitally signed. The keys used to sign manifests are authority keys. A manifest, called a device launch policy (DLP), specifies which authority keys are honored by the device, and is measured into an entry in the TLV table, referred to as a policy TLV entry. The policy TLV entry asserts that the device firmware and settings are accurately stated and thus the authority values are hashes of signing keys used to protect device manifests. A master device may verify that the device's integrity configuration meets information technology (IT) policies using the policy TLV entry. Such actions by device and master may be of a first phase of a lockstep integrity reporting protocol. For example, IT can construct a whitelist of TLV policy entries that corresponds to the entries generated by the hardware. A compare function will determine which TLVs are not in the whitelist and therefore not authorized by IT.

In some environments, a cryptographic hash (aka measurement) of each code image (e.g., device firmware and PCI configuration settings) that was loaded by the device can be created. In different implementations, a manifest containing actual hashes of the images can be hashed, or the images can be hashed directly. Such hashes can be computed using an embedded hashing function (such as secure hash algorithm 1 (Sha1), Sha2, or advanced encryption standard hash-based message authentication code (HMAC), cipher message authentication code (CMAC), etc.). The detail integrity values are written into a detail TLV entry that stores a hash of the firmware configuration settings. The master device may then access this detail TLV entry in a second phase of the protocol.

The PCIe™ configuration space thus may contain control indicators (which in one embodiment can be implemented using control bits), namely the device and master indicators, for gating a multi-phase protocol. In one such embodiment, a device-ready-0 (DR0) indicator can be used to report when authority measurements are ready for consumption by a reader/verifier device. In turn, a device-ready-1 (DR1) indicator can be used to report when detail measurements are ready for consumption. In turn, the master uses a master-ready 0 (MR0) indicator to signal when it has completed the first phase of integrity processing. Then the master uses a master-ready 1 (MR1) to conclude the second phase. The master thus concludes the first and second phases by setting of the corresponding MR bits. Thus the protocol proceeds in lockstep such that the device cannot complete its integrity checks until the master confirms successful completion of at least a portion of the checks. Additional bits can be used as master ready bits when there are multiple masters.

Figure 3:
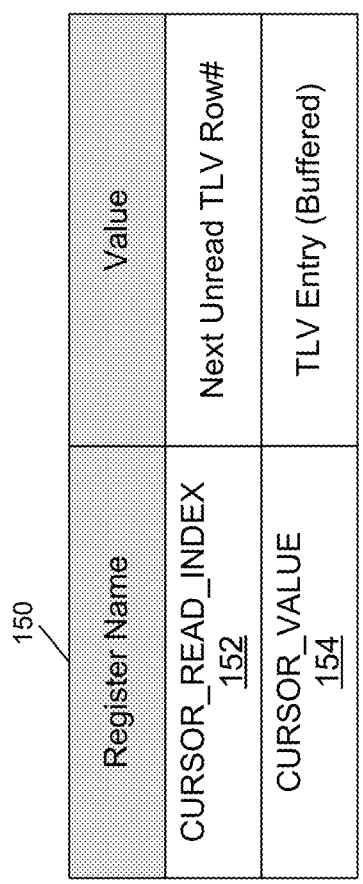
FIG. 3 is a block diagram of a cursor storage in accordance with one embodiment of the present invention.

Referring now to FIG. 3, shown is a block diagram of a TLV cursor in accordance with one embodiment of the present invention. The master reads TLV entries using TLV cursor 150, which generally includes a register field and a value field. The CURSOR_READ_INDEX register 152 points to the next unread TLV entry and the CURSOR_VALUE register 154 contains the TLV entries that are available for transfer. In various embodiments, the TLV cursor may be present in the configuration space, e.g., at a head of the TLV table itself.

In turn, a TLV table in accordance with an embodiment of the present invention is shown in FIG. 4. As seen, TLV table 160 is an example table of measurements including both policy and detail TLV entries (generally $162_0$-$162_7$). Each entry includes a type or tag field 164, a length field 166 and a value field 168. Tag field 164 may be used to identify the measurement type, and length field 166 may be used to specify the length of value field 168. In turn, value field 168 may contain various information including a globally unique identifier (GUID) identifying the manifest or image that was measured. The next portion of this field, <alg>, identifies the hash algorithm the device used to measure the manifest, and in turn the last portion of this field, <hash>, is the result of the hash computation.

Figure 5:
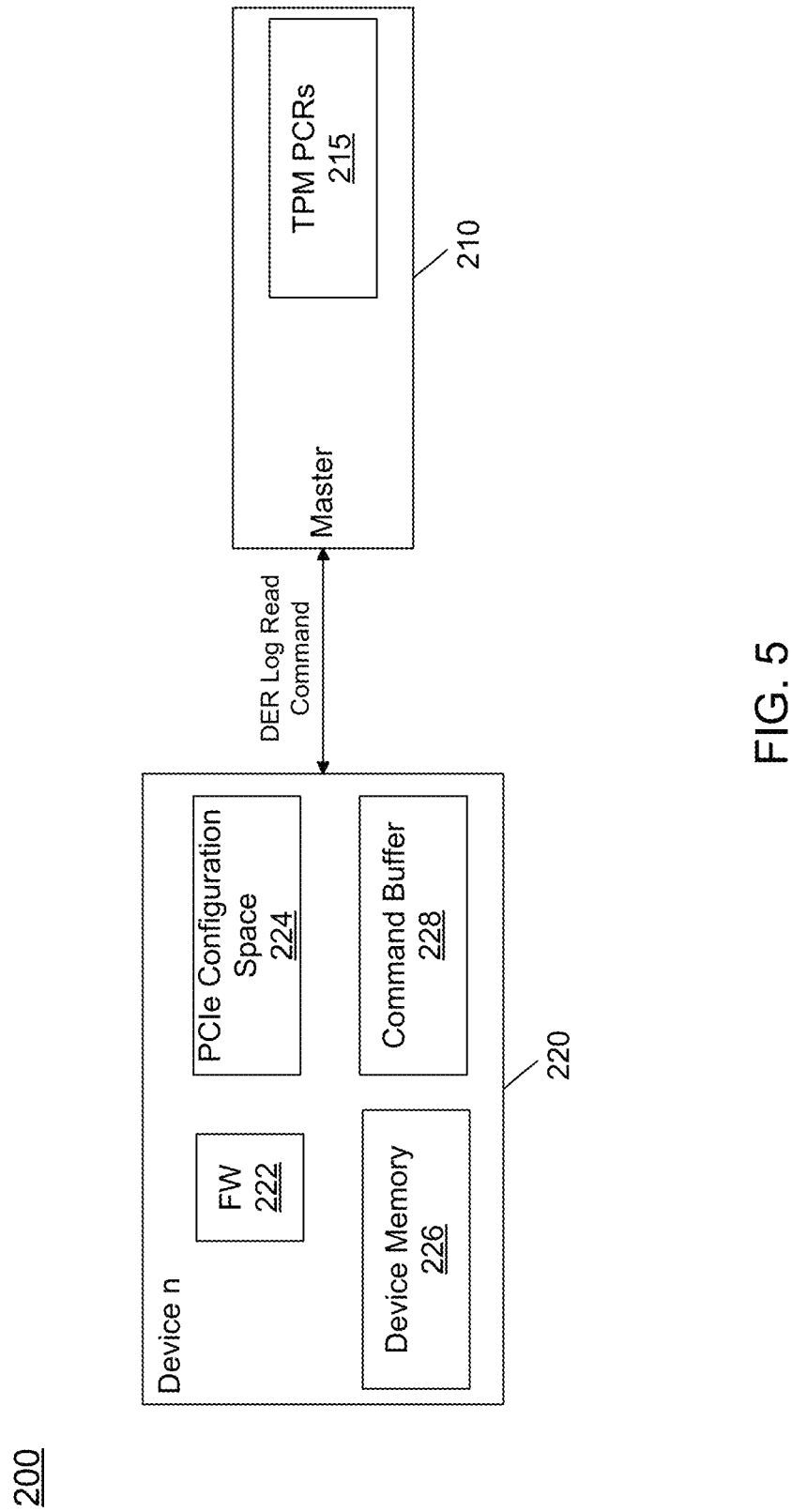
FIG. 5 is a block diagram of master and slave devices in communication in accordance with an embodiment of the present invention.

Referring now to FIG. 5, shown is a block diagram of a master and slave device in communication in accordance with an embodiment of the present invention. As shown in FIG. 5, system 200 includes a master 210 that may include a set of TPM platform configuration registers (PCRs) 215. As seen, the master may be coupled to a device 220 by a bus 230 which in one embodiment may be the root complex bus. In turn, device 220 may include various components including a firmware image 222, a configuration space 224, a device memory 226 and a command buffer 228. An authentication table such as shown above in FIG. 4 may be included in configuration space 224 in addition to the various other integrity data discussed above with respect to FIG. 2. In operation of the system of FIG. 5, master 210 may request the device entry log (DEL) entries from device 220 used to report device log information, where the number of entries exceeds the limited resources in the PCI configuration area. In such a scenario, the device can implement a virtual device method (VDM) that supports reporting the DEL through a command interface. In one such embodiment, the device may double buffer DEL content to avoid security risks associated with returning a pointer into device memory pages. The communication may be via a device entry register/record (DER) log read command, which uses a fixed size buffer used to report the device log information.

Figure 6:
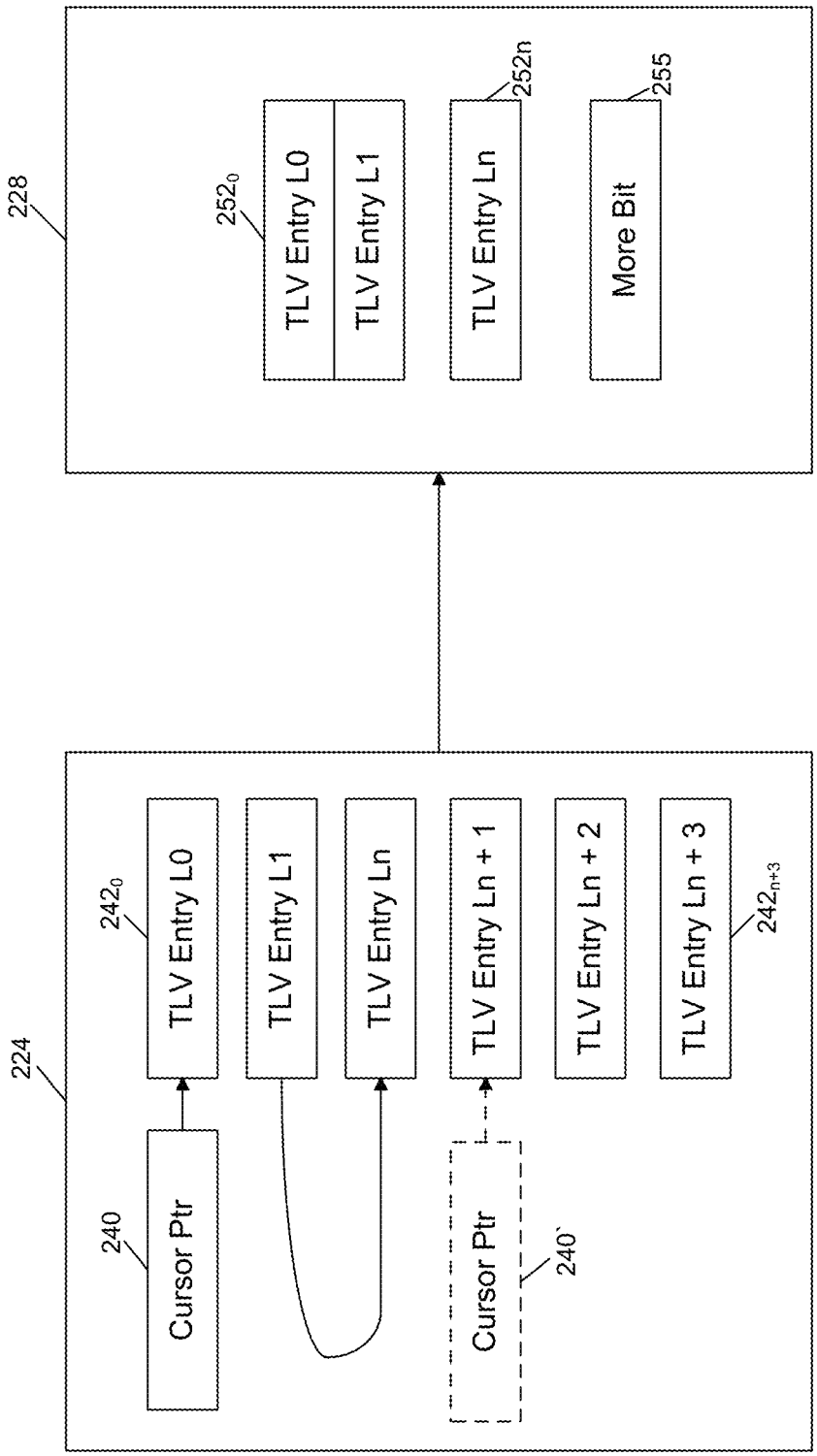
FIG. 6 is a block diagram of a memory representation including double buffering in accordance with an embodiment of the present invention.

Referring now to FIG. 6, shown is a block diagram of a memory representation including double buffering in accordance with an embodiment of the present invention. As seen, to perform a memory copy for information present in a configuration space, certain entries of a table can be copied to a command buffer. Specifically, as shown in FIG. 6, a portion of a configuration space 224 is shown, along with a command buffer 228. As seen, entries of a TLV table 242 stored in the configuration space may be implemented as a linked list having a plurality of entries $242_0$-$242_{n+3}$. A pointer 240 (and later 240') may be used to point to a current entry to be read. As seen, entries are buffered via a memory copy operation to command buffer 228. Specifically entries $252_0$-$252_n$ are copied over. In FIG. 6, log entries are represented as an indexed array 242 or linked list where cursor pointer 240 is used to maintain a reference to the current TLV entry in the list.

Command buffer 228 may be used to communicate entries to the caller. However, because the command buffer may be of limited size, the entire structure cannot fit into a single command buffer. In such implementations, a more bit 255 is used to indicate to the caller when additional entries exist. If the more bit is TRUE, then the caller re-issues the VDM again until the more bit becomes FALSE, or until the caller aborts the operation. After each command invocation, the cursor pointer is updated (shown in FIG. 6 as 240') to refer to the un-copied log entries until all are copied. Then the pointer can be reset to the beginning of the list.

Figure 7:
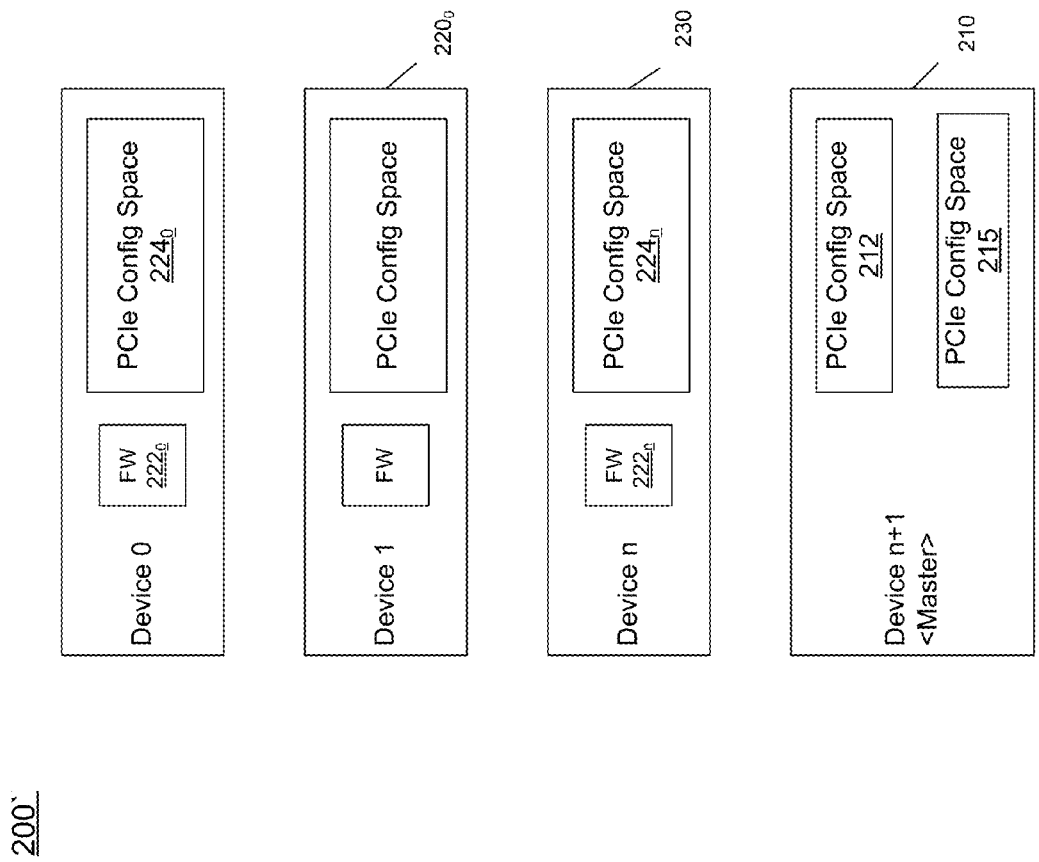
FIG. 7 is a block diagram of a master-slave model for collecting device integrity measurements in accordance with one embodiment of the present invention.

FIG. 7 shows a block diagram of a master-slave model for collecting device integrity measurements. As seen a master device 210 is coupled to a plurality of devices 220 via a bus 230. Devices 220 may act as slaves to the master. As seen, system 200' includes master 210 having a configuration space 212 and TPM PCRs 215. Via bus 230, master 210 may be coupled to a plurality of devices $220_0$-$220_n$, each of which may include a firmware image $220_0$-$220_n$ and a configuration space $224_0$-$224_n$. Master device 210 asserts implicitly that all the devices on the bus trust it. This may be implemented via a TPM with additional functions for polling root complex devices and processing integrity values using local PCRs 215.

Figure 8:
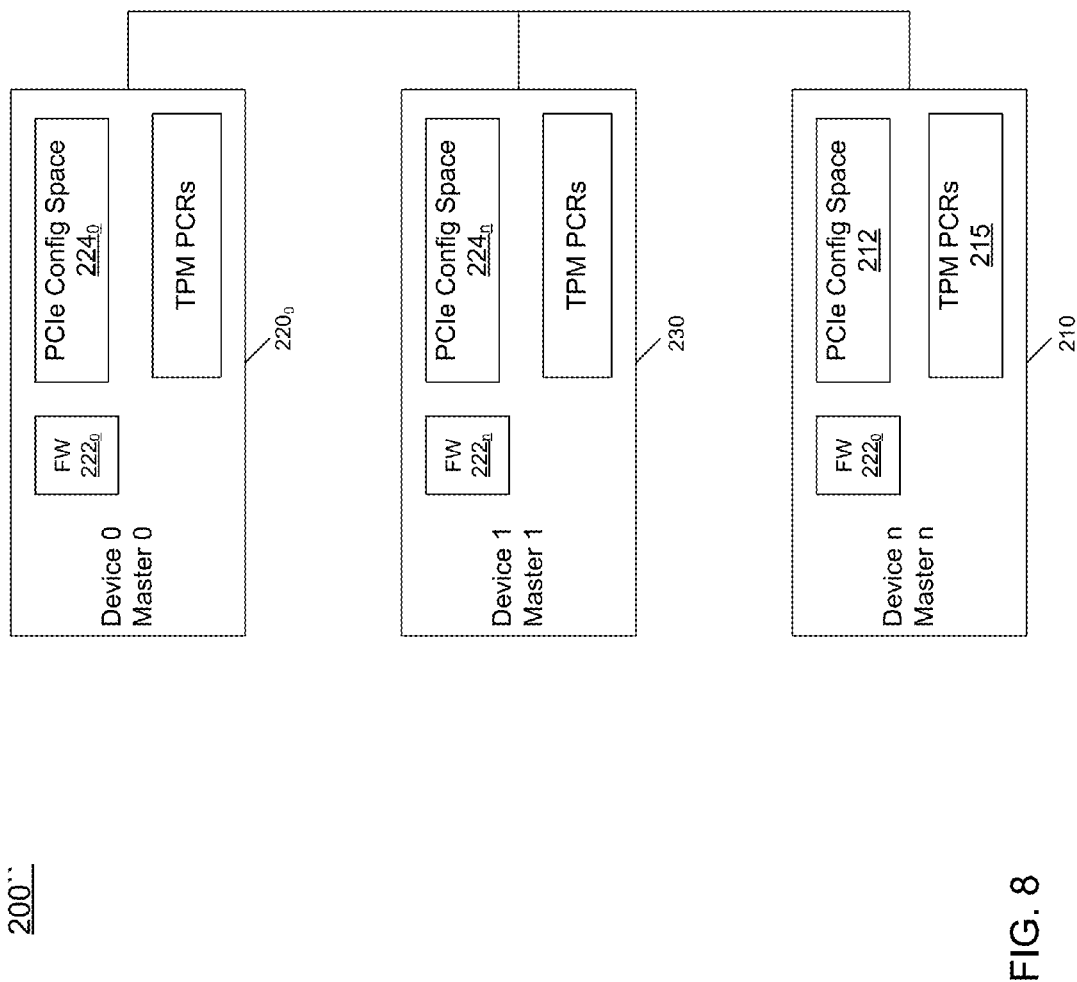
FIG. 8 is a block diagram of a system in accordance with yet another embodiment of the present invention.

Referring now to FIG. 8, shown is a block diagram of a system in accordance with yet another embodiment of the present invention. As shown in FIG. 8, system 200'' may include multiple devices 220, each of which includes firmware, configuration space and TPM PCRs. In this way, each node can act as a master and/or a device. Specifically, in FIG. 8, a peer-to-peer model is depicted where each node is both a device that reports its integrity and a master that collects the integrity values from other devices. Each master may contain the equivalent of a TPM PCR suitable for reporting integrity data to application software, a management console or other network service. In one embodiment of this model, each master attempts to collect integrity information from the other devices in a round-robin fashion.

Figure 9:
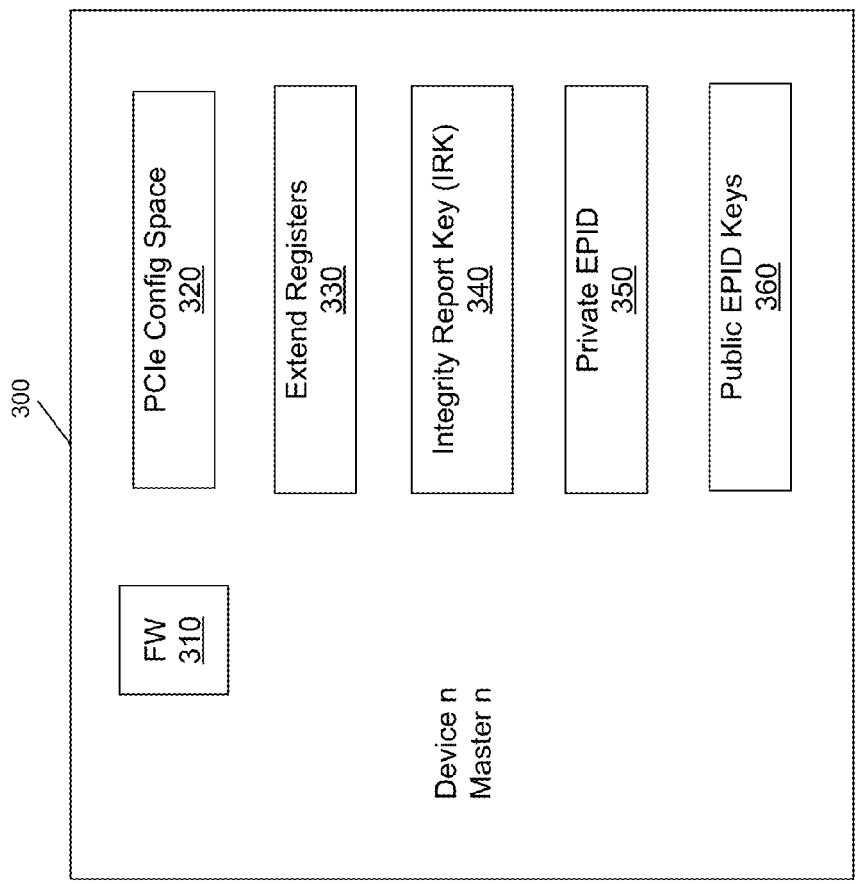
FIG. 9 is a block diagram of an integrity verification using an enhanced privacy identifier (EPID) in accordance with one embodiment of the present invention.

FIG. 9 is a block diagram of an integrity verification using an enhanced privacy identifier (EPID) in accordance with one embodiment of the present invention. The EPID is an asymmetric cryptographic system that has multiple private keys for a single instance of a public key. Device 300 of FIG. 9 may act as a device and/or master depending on the situation. As seen, the device may include a firmware image 310 and various structures to perform integrity measurements in accordance with an embodiment of the present invention. Specifically, in addition to a configuration space 320, a set of extend registers 330 may be present. Still further, an integrity report key (IRK) 340 may be present along with private and public EPID keys 350 and 360. An EPID formed of private and public keys 350 and 360 can be used to report integrity values as an alternative to implementing TPM functionality in each device, as implementation of a TPM may be cost prohibitive and pose deployment costs to IT. Devices containing an EPID can use the EPID to digitally sign an integrity report key (IRK) 340 which in turn can be used to authenticate integrity values, AER and DER. IRK 340 may be a locally generated symmetric key used to perform an HMAC or AES_CMAC of extend registers 330. The IRK may be used when reporting protocols seek protection from reply attacks and a nonce and other information is supplied by a caller. Note that if an IRK is not used, then the EPID can be used to sign extend registers directly. The device acting as a master may verify integrity reports it collects by verifying the EPID signature using an embedded copy of EPID public key 360. Since a single EPID public key may be used to manufacture multiple EPID device identifiers, a single EPID public key may be used to verify multiple devices.

As described above, embodiments may be applicable to systems of various types, which may run in various environments. For example, as mentioned above, a processor may execute a hidden resource manager. In general, a full range of memory is visible to system software such as an operating system (OS) or virtual machine monitor (VMM). However, to provide for secure operations and so forth, a hidden partition may be provided in memory that includes code that can run using a resource manager, which may be implemented, e.g., in processor microcode or via a software thread and which can be hidden from the OS/VMM. In such implementations a multi-phase lockstep protocol can be used to authenticate devices.

Figure 10:
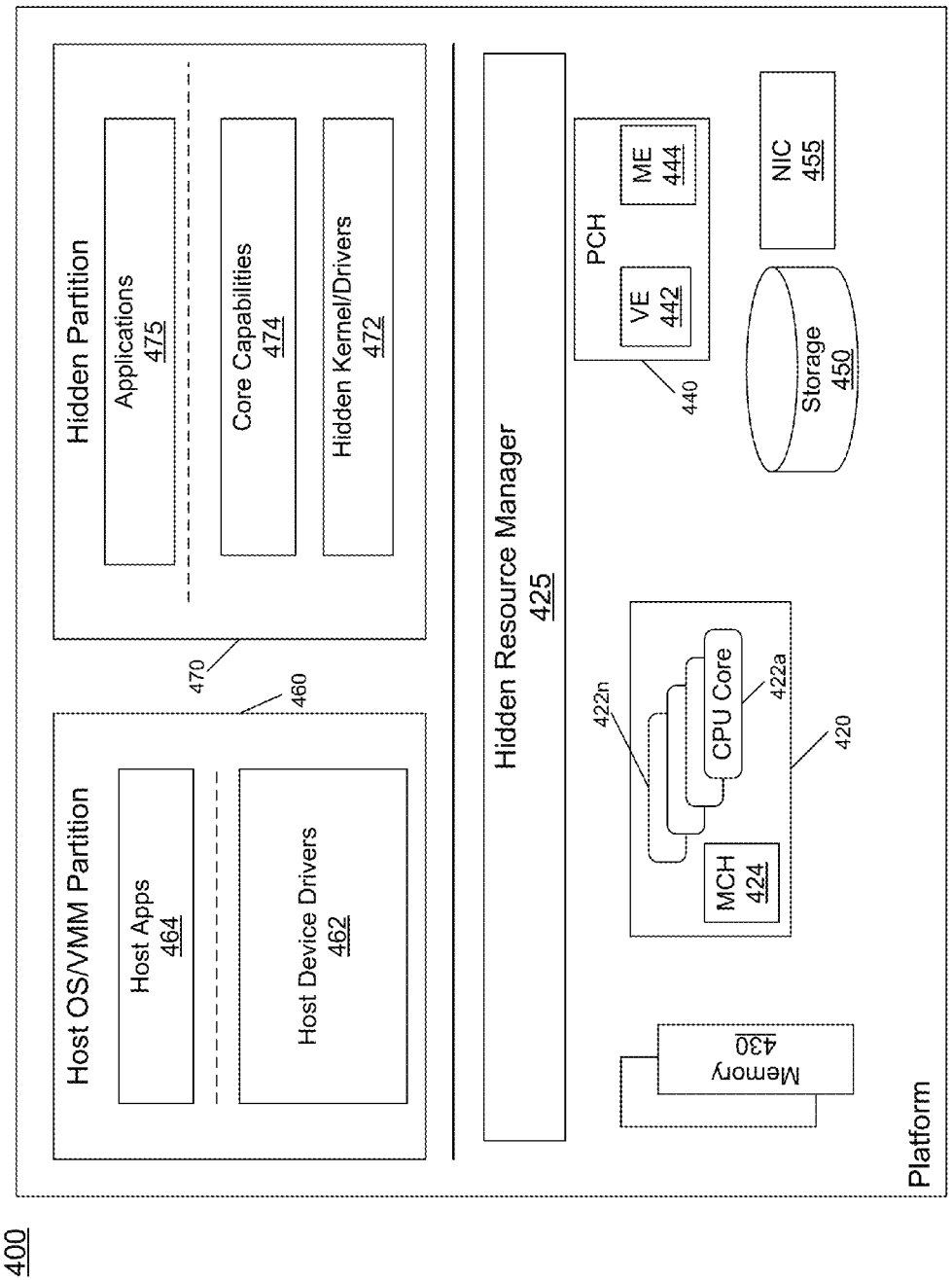
FIG. 10 is a block diagram of a platform in accordance with one embodiment of the present invention.

Referring now to FIG. 10, shown is a block diagram of a platform in accordance with another embodiment of the present invention. As shown in FIG. 10, platform 410 may be any type of computer system such as server computer, desktop computer, laptop computer, tablet, netbook computer or so forth. The platform includes various hardware and software to operate together to perform requested operations. As seen, the platform hardware includes a processor 420, which in one embodiment may be a multicore processor including a plurality of processor cores $422_a$-$422_n$. Each core 422 may include microcode for execution in a hidden environment, where this environment is hidden from other system software such as an OS or VMM. As further seen, processor 420 includes an integrated memory controller hub (MCH) 424 to communicate with a system memory 430, which in one embodiment may be a dynamic random access memory (DRAM).

Additional hardware of platform 410 may include a PCH 440 that may include a VE 442 and a ME 444 which may provide control functions for various peripheral devices such as a storage 450, e.g., a mass storage such as a disk drive, optical or other non-volatile storage. In addition, a network interface controller (NIC) 455 may enable communication between platform 410 and other agents of a network such as a wired network, e.g., a local area network (LAN), a wireless network such as a wireless LAN (WLAN), or a wide-range wireless network such as a cellular network. While shown with this particular hardware in the embodiment of FIG. 10, understand the scope of the present invention is not limited in this regard.

As further seen in FIG. 10, various software is also present. Firstly, shown is a hidden resource manager (HRM) 425. As seen, this layer of software may act as an interface between underlying processor hardware and a hidden partition 470. In one embodiment, HRM 425 may be implemented as processor microcode stored in a microcode storage of the processor. Note that this microcode and storage may be separate from conventional microcode and microcode storage that is used to provide processor instructions for corresponding user-level instructions of an instruction set architecture (ISA). However, in some embodiments, the hidden microcode and the conventional microcode may be stored in different partitions of a single microcode storage.

The resource manager may execute to provide services to code of hidden partition 470. As seen, various code may be present in this hidden partition, which may be stored in a partition of, e.g., system memory 430 that is segmented and hidden from other system software, i.e., the OS and VMM. Hidden partition 470 includes various code, including one or more hidden kernels and drivers 472, which may provide kernel services as well as drivers for interfacing with various devices of the platform. Additional core capabilities code 474 may be present, in addition to one or more applications 475 that may execute in the hidden execution environment. Although the scope of the present invention is not limited in this regard, the hidden execution environment may be for operations such as implemented to follow a formal security model that provide higher integrity than a general-purpose OS. In addition, platform 410 includes conventional software including a host OS/VMM partition 460, which may include various host device drivers 462 and host applications 464. Such code may be stored in another partition of system memory 430. HRM 425 may provide an abstraction of the system hardware to the OS/VMM partition.

As will be described below, in one embodiment a multi-phase lockstep integrity protocol may be used in an environment including a transient kernel of the hidden environment, referred to as Kernel-0 that acts as a boot loader to launch a persistent kernel (Kernel-1) of the hidden environment. Then Kernel-1 verifies application code integrity using a launch control policy supplied by Kernel-0. Integrity measurements of the application(s) may be recorded in a log file called a launch history.

Figure 11:
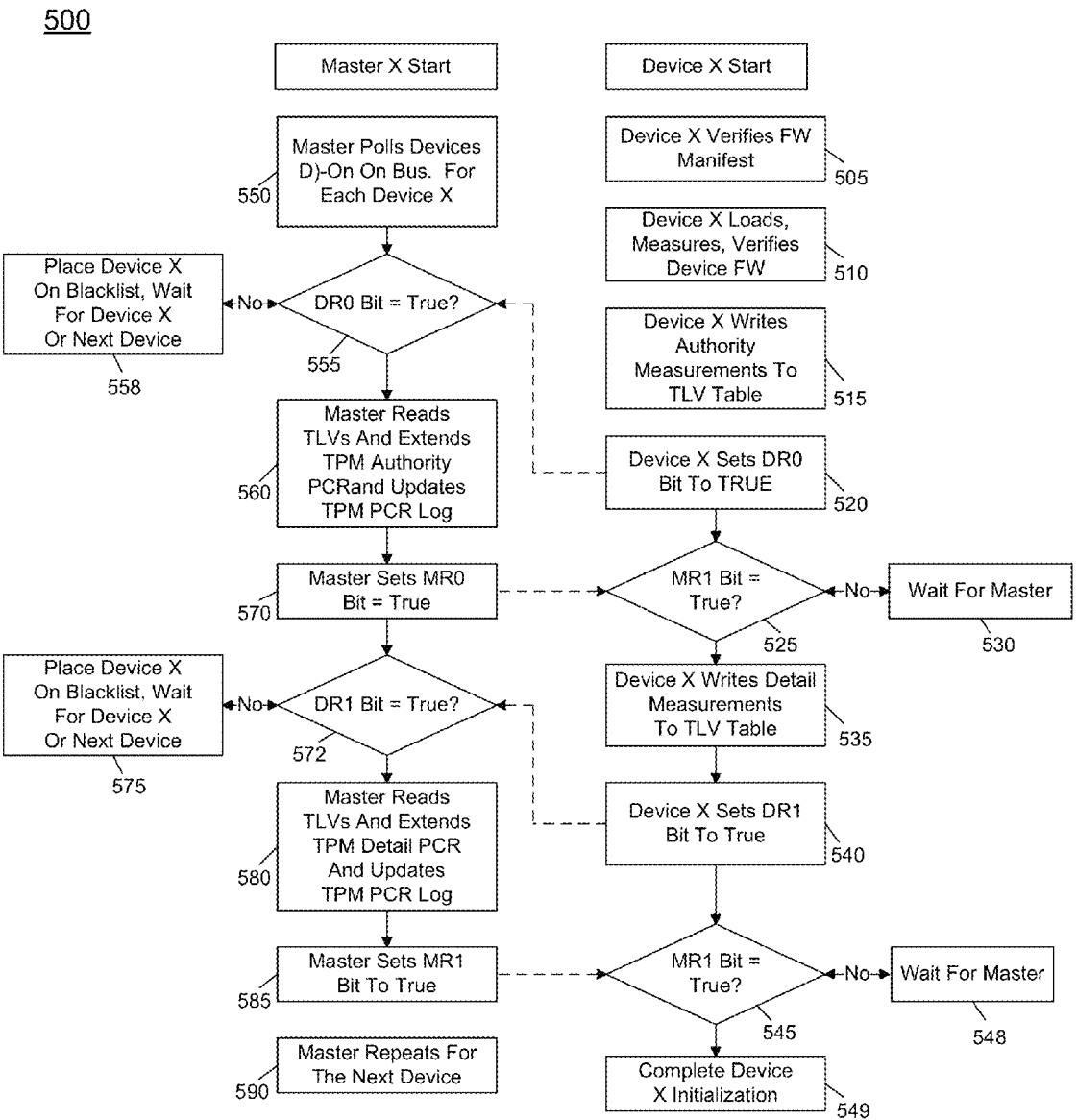
FIG. 11 is a flow diagram of a multi-phase lockstep integrity method in accordance with one embodiment of the present invention.

Referring now to FIG. 11, shown is a flow diagram of a multi-phase lockstep integrity method in accordance with one embodiment of the present invention. In FIG. 11, shown is a 2-phase lockstep integrity reporting protocol flow for a single master and multiple devices. Each master node when used in a peer-peer configuration repeats the protocol. As seen, operations for a device (beginning at block 505) and master (beginning at block 550) can be performed in parallel.

With regard to device operations, a device X begins by verifying device manifests for its firmware using an embedded verification kernel (block 505). Next, at block 510, the manifest is used to load, measure and verify device firmware (but does not execute it). The device then measures the authority keys manifest and creates a policy TLV entry by writing authority measurements to an entry of its TLV table (block 515). The device sets its device ready bit (DR0) to TRUE (block 520) and blocks on the MR0 bit (diamond 525), meaning the device enters a wait state until the master has set this bit.

In parallel, the master polls device X and blocks on the DR0 bit (block 550). That is, if DR0 FALSE is determined at diamond 555, device X is not ready and may be placed on a blacklist (block 558) so that regular service requests from this device will not be honored. In one embodiment, the master may refuse to route messages to any of the slave devices on the black list. A more complex policy can specify specific VDMs that are allowed/denied. If the device supports VDMs for disabling the device, the master may choose to disable the device (assuming the device vendor implements a disable command that allows the device to make progress on the 2-phase protocol while disabled.) The master may remain blocked on the device X DR0 bit, or continue polling other devices. When DR0 becomes TRUE, control passes to block 560, where the master reads the authority values from the TLV entries (e.g., the policy TLV entries) and extends TPM authority PCRs and updates a TPM PCR log. Then at block 570, the master sets the device X master ready bit (MR0) to TRUE, e.g., using a VDM function. In peer-peer mode, the VDM message may be authenticated by the device using EPID signing or TPM signing keys and the master ready bits associated with each specific master are employed.

Now with reference back to the device side, at diamond 525 the device may block if MR0 is FALSE and thus the device waits for the master to become ready (block 530). Note that in peer-peer mode there can be a separate MR0 bit for each master. The second phase of the authentication process may begin when the device measures the image manifests containing hashes of the image, or the device dynamically measures the images (block 535). Accordingly, detail TLV entries are created. Then the device sets its DR1 bit to TRUE (block 540).

With reference back to master operations, if the DR1 bit is FALSE as determined at diamond 572, the master blocks at block 575, with the device X on the blacklist. When DR1 becomes TRUE, the master reads the detail TLV entries and extends TPM detail PCRs and updates the TPM PCR log accordingly (block 580). The master then sets the second master ready bit (MR1) to TRUE and removes device X from the blacklist (block 585). In turn, the device blocks on MR1 bit until the master is ready (diamond 545 and bock 548). When the device detects that MR1 is now TRUE, it completes its device initialization and is available for normal operation (block 549). The master polls for the next device (block 590). While shown in the embodiment of FIG. 11, understand that the scope of the present invention is not limited in this regard.

Figure 12:
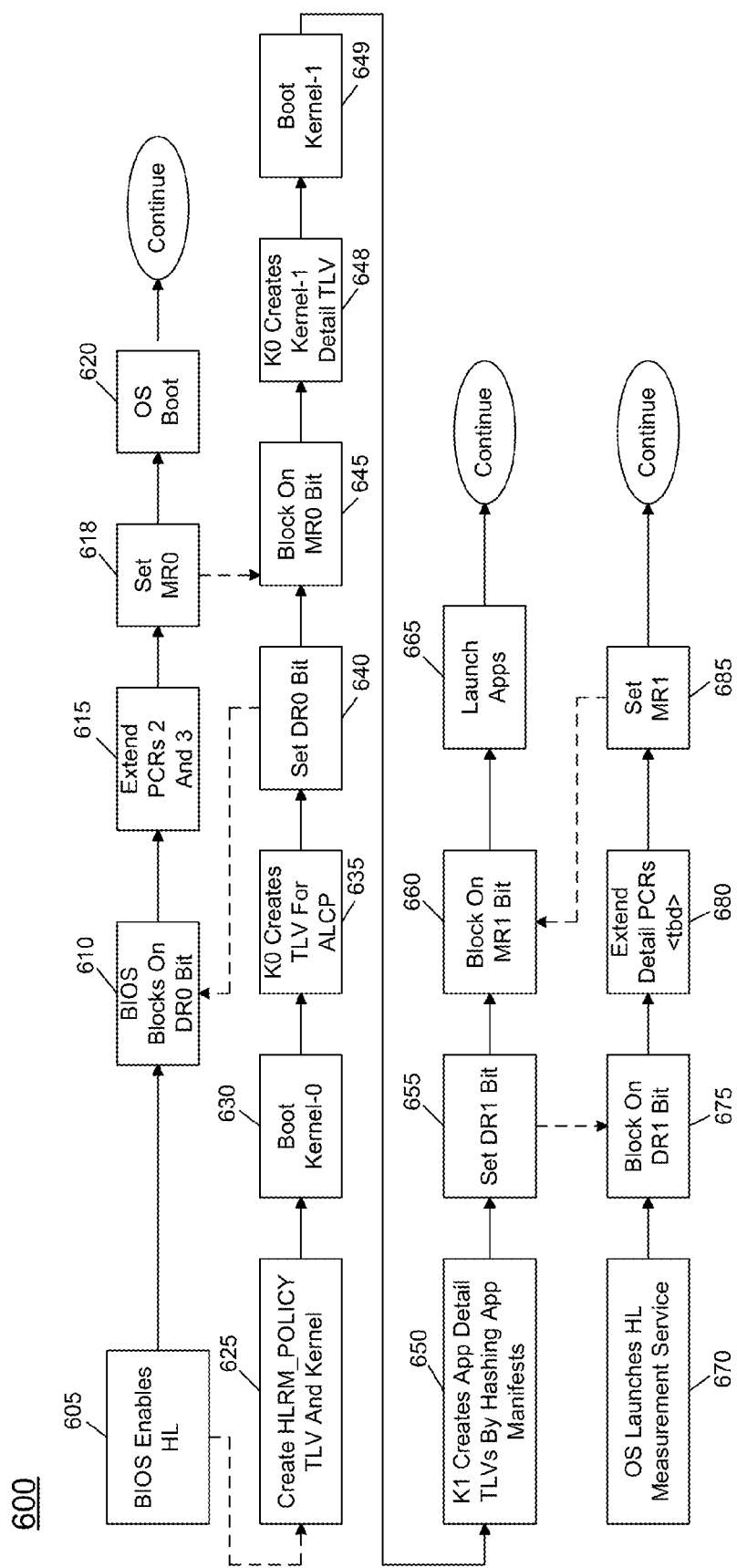
FIG. 12 is a flow diagram of a multi-phase integrity reporting method in accordance with one embodiment of the present invention.

In BIOS and hidden execution environments, a 2-phase lockstep integrity reporting protocol may be performed in a master-slave mode in which the BIOS plays the role of master and the hidden execution environment performs the device role. Referring now to FIG. 12, shown is a flow diagram of a 2-phase integrity reporting flow method 600 in accordance with one embodiment of the present invention. In the embodiment of FIG. 12, various operations are performed by each of the BIOS, the hidden execution environment and an OS, when the BIOS sets a feature control machine specific register (MSR) enabling the hidden execution environment feature to become active (block 605). At block 610, the BIOS blocks on the DR0 bit until integrity measurements from the hidden execution environment are ready.

Now as to operations performed by the hidden execution environment, the HRM creates a policy TLV containing hidden public keys (HPK) including the keys used to verify Kernel-0 and Kernel-1 images and it also creates a detail TLV entry for Kernel-0 (block 625). The HRM boots Kernel-0 after it has been verified by HRM using the HPK (block 630). Note if Kernel-0 verification fails, the authority TLV is disposed of and the HRM is reset. Next, Kernel-0 creates an authority TLV for the hidden execution environment applications by hashing a launch control policy (LCP) manifest (block 635).

Then the HRM sets the DR0 bit (block 640). The HRM blocks on the MR0 bit until the BIOS has completed extending PCRs (block 645). Referring back to BIOS operations, the BIOS extends authority and detail PCRs for entries in the log (block 615). BIOS also may set the MR0 bit, allowing the hidden execution environment to continue (block 618). The BIOS also boots the main OS, which assumes the role of master (block 620). The OS launches a hidden measurement service (HMS) to continue the role of master (block 670). The HMS blocks on the DR1 bit until the remaining integrity values are ready (block 675).

With reference back to the hidden execution environment operations, Kernel-0 creates detail measurements for Kernel-1 and places them in a TLV entry (block 648). Kernel-0 then launches Kernel-1 (block 649). In turn, Kernel-1 create detail measurements for each application and creates TLV entries by hashing the application manifests (block 650). Kernel-1 sets the DR1 bit, signaling the HMS to proceed (block 655). Kernel-1 blocks on the MR1 bit waiting for HMS to complete (block 660). HMS extends detail PCRs in a TPM using TLV entries managed by the HRM (block 680). HMS signals Kernel-1 to continue by setting the MR1 bit (block 685). Finally, Kernel-1 launches the hidden execution environment applications (block 665). The two-phase protocol ensures that the master environment cannot become compromised by rogue software in the hidden execution environment somehow affecting the master's ability to safely update PCR values.

Figure 13:
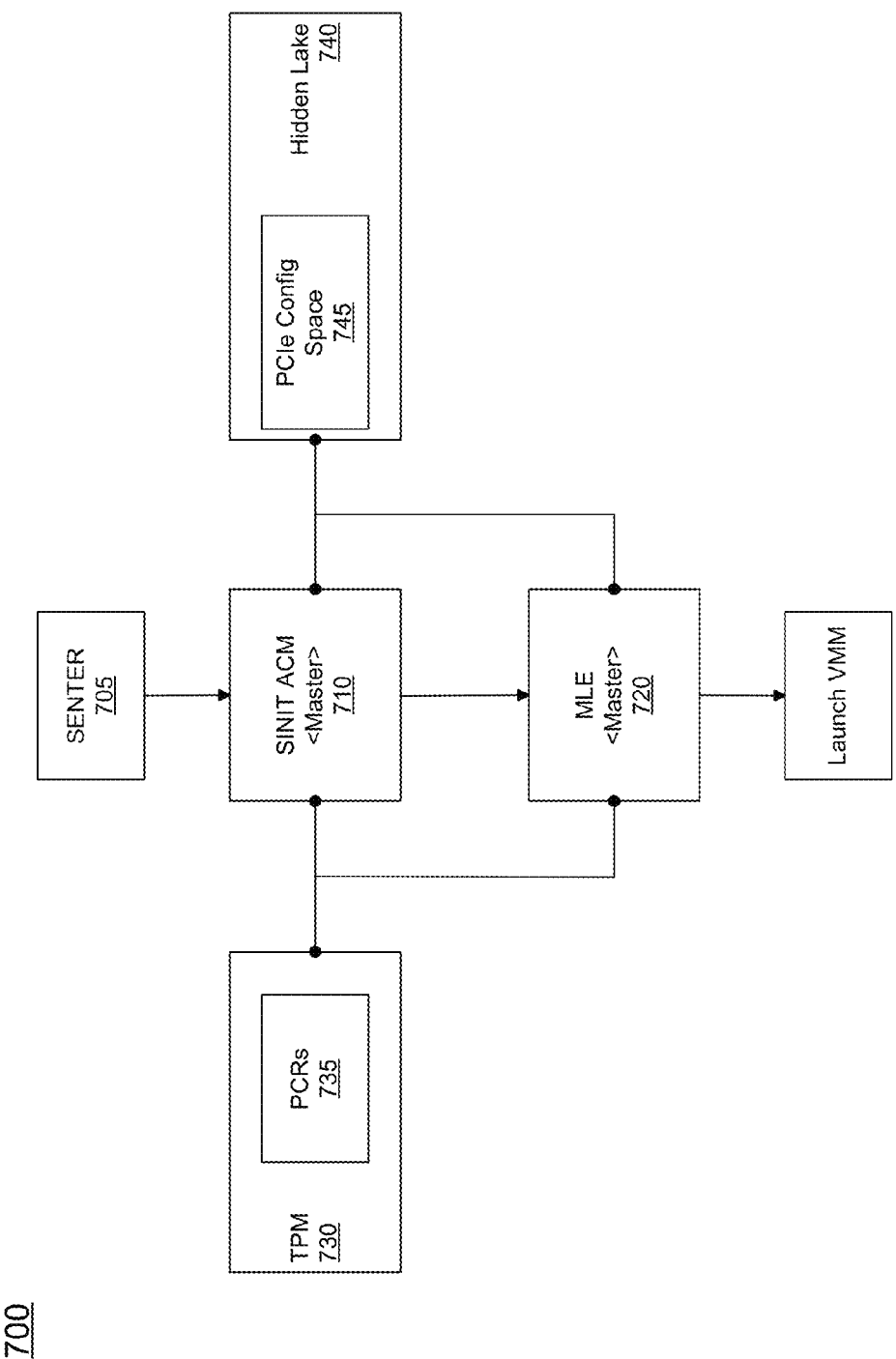
FIG. 13 is a block diagram of a system in accordance with another embodiment of the present invention.

Of course, other implementations of a multi-phase lockstep integrity reporting are possible. Referring now to FIG. 12, shown is a block diagram of a system in accordance with a still further embodiment of the present invention. As shown in FIG. 12, system 700 may include a master device 720 that is coupled to a hidden execution device 740 which may include a configuration space 745. To enable execution of the master, a secure initialization authenticated code module (SINIT ACM) 710 may be present and may couple further to a TPM 730 which may include a set of PCRs 735. In the embodiment of FIG. 13, Trusted Execution Technology (TXT) plays the role of master and the hidden execution environment plays the device role. In this model, SINIT ACM 710 may be launched as a result of a SENTER instruction 705 being issued. SENTER causes the hidden execution environment to suspend. SINIT runs in a constrained environment where it may not be able to perform the entire master side of the protocol. SINIT may delegate some or all of its role to master 720, as the master operates with the same privilege level as SINIT. Due to the special nature of the SENTER state, the 2-phase lockstep protocol is not followed. Instead, integrity values computed at system boot up can be carried forward. SINIT/master ensures that the dynamic launch PCRs (e.g., of block 680 of FIG. 12) are updated before the hidden execution environment is permitted to execute. In one embodiment, this implementation may proceed as follows. If hidden execution is not enabled/running, then the master can be invoked. SENTER causes hidden execution to be suspended, and initiate entry into SINIT, which verifies and extends a hidden execution driver into a PCR, and then loads the hidden execution driver. This driver may be a system management mode (SMM) transfer monitor of TXT that protects a system from unauthorized SMM interrupts that may compromise the measurements before they are extended into the TPM. Next, SINIT obtains TLV entries from the HRM that were generated at first system boot, and extends detail entries into a first TPM PCR, and extends authority entries into a second TPM PCR. Finally, SINIT re-enables the hidden execution environment.

Embodiments thus enable PCIe™ devices to measure firmware and configuration file integrity at load time by directly computing an integrity hash of the image (or by verifying an integrity hash contained in a manifest, and then taking a measurement of the manifest). Measurements can be reported to other PCIe™ devices using PCIe™ configuration space, which can be configured to be readable by other devices and virtual devices but writable only by the PCIe™ device. Alternately, devices with an EPID can be authenticated to a trusted device manufacturer. The EPID can be used to sign reported integrity measurements so that participant devices can verify device integrity. Still further, host environments such as BIOS, OS and TXT can extend TPM PCRs and verify hidden execution environment manifests prior to that environment being given full privileges to operate and use the device reporting mechanisms to establish trust in the device/virtual device (such as the hidden execution environment) before the device is allowed to have full access to other platform resources.

Accordingly, root complex devices including virtual PCIe™ devices such as a hidden execution environment and a ME or VE can be blacklisted such that they cannot interact with other platform components until an integrity check has been performed. In one embodiment, the uncore/CPU (e.g., of FIG. 1) enforces the blacklist.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of cores and a memory controller, wherein the processor is to enforce a blacklist and validate a device coupled to at least one of the plurality of cores according to a multi-phase lockstep integrity protocol in which the processor and the device each perform an integrity protocol gated by control indicators, the blacklist including a list of devices that have not been validated according to the multi-phase lockstep integrity protocol, the processor to act as a master to perform at least a portion of the multi-phase lockstep integrity protocol, to prevent the device from interaction with other components of a platform including the processor and the device until the multi-phase lockstep integrity protocol is completed, the master to place the device on the blacklist responsive to a first value of a first control indicator of the device, to perform a first phase of the multi-phase lockstep integrity protocol responsive to a second value of the first control indicator, and to perform a second phase of the multi-phase lockstep integrity protocol responsive to a second value of a second control indicator of the device.

2. The processor of claim 1, wherein the master is, responsive to the second value of the first control indicator, to extend a first trusted platform module (TPM) platform configuration register (PCR) responsive to an authority value read from a policy entry of a table of the device written by the device after the device has completed at least a portion of the first phase of the multi-phase lockstep integrity protocol.

3. The processor of claim 2, wherein the first phase includes a verification by the device of device firmware.

4. The processor of claim 3, wherein the device is to load the device firmware and configuration settings.

5. The processor of claim 2, wherein the master is, responsive to the second value of the second control indicator, to extend a second TPM PCR responsive to a detail value read from a detail entry of the table written by the device after the device has completed at least a portion of the second phase of the multi-phase lockstep integrity protocol.

6. The processor of claim 2, wherein the table includes a plurality of entries each having a type field to indicate a type of measurement stored in the entry, a length field to indicate a length of a value field, and the value field to identify a measured agent, an algorithm used to perform the measurement, and a result of the algorithm.

7. The processor of claim 6, wherein the table is to be stored in a configuration space of the device, the configuration space further including device indicators including the first control indicator and the second control indicator each to indicate when the device has completed a phase of the multi-phase lockstep integrity protocol and master indicators each to indicate when the master has completed a phase of the multi-phase lockstep integrity protocol.

8. The processor of claim 1, wherein the device comprises a configuration space to store configuration information and an enhanced privacy identifier (EPID) formed of a plurality of keys.

9. The processor of claim 1, wherein a first core of the plurality of cores is to execute a hidden resource manager to execute operations of a hidden partition of a system memory.

10. The processor of claim 9, wherein the hidden resource manager comprises first microcode stored in a first microcode storage of the processor.

11. The processor of claim 10, further comprising a second microcode storage to store second microcode, wherein the first and second microcode storages are separate storages.

12. An apparatus comprising:
a slave to couple to a master via an interconnect and including a configuration space, a device memory, and a first storage to store a firmware, wherein the slave is to proceed through a plurality of phases of an integrity report protocol before the slave is allowed to access at least one resource of a system, the slave to be on a blacklist to prevent interaction of the slave with the at least one resource until the plurality of phases of the integrity report protocol have been completed, the blacklist including a list of devices that have not been validated according to the plurality of phases including a verification by the slave of the firmware and a measurement of an image manifest, wherein the slave is to set a first device indicator in an integrity data structure of the configuration space after the verification of the firmware, measure the image manifest after a first master indicator in the integrity data structure is set, and set a second device indicator in the integrity data structure after measurement of the image manifest, and the master is, after the first device indicator is set, to read an authority measurement regarding the firmware verification written by the slave in the integrity data structure.

13. The apparatus of claim 12, wherein the slave is to write a detail entry regarding the image manifest measurement in the integrity data structure after the second device indicator is set.

14. The apparatus of claim 13, wherein the slave is to complete initialization after a second master indicator in the integrity data structure is set.

15. A non-transitory computer readable storage medium including data represented structures, when manufactured, to:
verify firmware of a device, write an authority measurement for the firmware in a table of the device and set a first device indicator in an integrity data structure of the device, wherein after the first device indicator is set, the table is to be accessed via a master coupled to the device to read the authority measurement, and responsive thereto to extend an authority platform configuration register (PCR) and place the device on a blacklist, to prevent the device from having access to at least one platform resource, the blacklist including a list of devices that have not been validated according to a multi-phase lockstep integrity protocol; and
responsive to the authority PCR extension, measure an image manifest of the device, write a detail entry for the image manifest in the table, and set a second device indicator in the integrity data structure, wherein after the second device indicator is set, the table is to be accessed via the master to read the detail entry and responsive thereto a detail PCR is to be extended and the device is to be removed from the blacklist.

16. The non-transitory computer readable storage medium of claim 15, wherein the data represented structures, when manufactured, to cause the device to compute an integrity hash of the firmware to verify the firmware, and write the authority measurement in a policy entry of a configuration space of the device.

17. The non-transitory computer readable storage medium of claim 16, wherein the data represented structures, when manufactured, to cause the master to be enabled to read at least a portion of the configuration space but not write to the configuration space.

18. The non-transitory computer readable storage medium of claim 17, wherein the data represented structures, when manufactured, to cause the device to measure the image manifest after a first master indicator is set in the integrity data structure after the authority PCR is extended.

* * * * *